United States Patent [19]

Miyatake et al.

[11] 3,973,981
[45] Aug. 10, 1976

[54] PIGMENT COMPOSITIONS
[75] Inventors: Masayuki Miyatake; Sengo Ishizuka; Takao Takagi, all of Tokyo, Japan
[73] Assignee: Toyo Ink Manufacturing Co., Ltd., Tokyo, Japan
[22] Filed: Dec. 30, 1974
[21] Appl. No.: 537,220

[30] Foreign Application Priority Data
Aug. 7, 1974  Japan.............................. 49-89850

[52] U.S. Cl............................. 106/288 Q; 106/20; 106/308 N
[51] Int. Cl.² ................... C08K 5/00; C09D 11/00; C09D 17/00
[58] Field of Search..................... 106/288 Q, 308 N

[56] References Cited
UNITED STATES PATENTS
2,863,875  12/1958  Bienert et al. .................. 106/288 Q
3,732,118  5/1973  Langley et al. ................. 106/308 N Primary Examiner—Winston A. Douglas
Assistant Examiner—J. V. Howard
Attorney, Agent, or Firm—Frank J. Jordan

[57] ABSTRACT

A non-crystallizing and non-flocculating pigment composition comprising as the base material a base organic pigment sch a phthalocyanine and as the additive a specified derivative of a starting organic pigment such as phthalocyanine.

11 Claims, No Drawings

PIGMENT COMPOSITIONS

This invention relates to excellently noncrystalline and non-flocculating pigment compositions and to a process for the preparation thereof.

The pigments contained in the pigment compositions for use in conventional paints, printing inks and the like, will very often flocculate thereby lowering the composition in tinting strength or disenabling it from effecting a uniform coloration. In addition, the transition and growth of crystals of the pigments will change the color of the composition and decrease the tinting strength thereof. Furthermore, due to the occurrence of these phenomena, the composition will increase in viscosity, cause flooding when used in admixture with pigments of other kinds and cause precipitation of the pigments and other undesirable problems. Therefore, some of the pigments are now restricted to be used in a non-aqueous dispersion system of a paint, gravure ink or the like.

In order to inhibit such transition and growth of crystals of the pigments as well as such flocculation of the pigments in the composition, there have heretofore been proposed various processes as illustrated hereunder. They include a process for incorporating copper phthalocyanine with a phthalocyanine of a different metal in large proportions as disclosed in Japanese Patent Gazettes 3534/58 and 12884/63, a process for treating the surface of pigments with a colorless organic material as indicated in U.S. Pat. No. 2,965,511, a process for adding a sulfonic compound of copper phthalocyanine as indicated in U.S. Pat. No. 2,238,243, a process for mixing copper phthalocyanine with substituted aminomethyl copper phthalocyanine as described in Japanese Patent Gazettes Nos. 16787/64 and 2713/63 and a process for adding phthalimidomethylquinacridone as indicated in Japanese Patent Gazette 13378/69.

However, these known processes are disadvantageous in that they when practiced will impair the clearness of the paint composition, decrease the tinting strength thereof and cause other problems. They are further unsatisfactory since they are not improved enough to effectively inhibit the flocculation from taking place in the dispersion system even if the crystallinity can be inhibited and also since they permit the precipitation of the pigments and cause other inconveniences.

This invention is one which has eliminated these known drawbacks.

A primary object of this invention is to provide pigment compositions which are compared with the conventional ones are excellent in general properties such as antiflocculation, solvent resistance and flow property in dispersion form.

Another object of this invention is to provide a process for the preparation of such excellent pigment compositions.

Other objects and advantages will be apparent from the following description.

This invention contemplates the use of the derivatives of organic pigments in admixture with organic pigments themselves, as a pigment composition.

Such organic pigment derivatives are represented by the following formula (I)

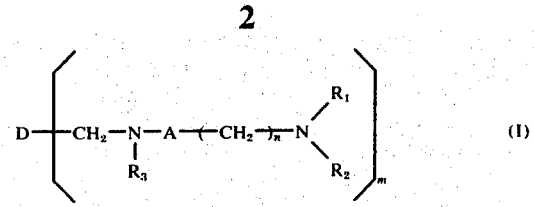

wherein D is the residue of a starting organic pigment; A is a carbonyl or sulfonyl group; $R_1$ and $R_2$ are each a hydrogen atom, non-substituted or substituted alkyl group, cycloalkyl group, aryl group or heterocyclic residue, $R_1$ and $R_2$ being allowed to together form a ring; $R_3$ is a hydrogen atom or lower alkyl group; n is an integer of from 1 to 2; and m is an integer of from 1 to 4.

The term "starting organic pigment" is intended to mean an organic pigment from which the organic pigment derivative (I) is obtained.

The pigment compositions of this invention comprise at least one base organic pigment and at least one derivative of a starting organic pigment, the derivative being represented by the formula (I). They are novel pigment compositions which are free of the drawbacks of the conventional ones and have all of said advantages.

The organic pigment derivatives represented by the general formula (I) are considered to be prepared by various processes; however, as mentioned in Reference examples to be described later, they are conveniently prepared by any one of the following two processes (1) and (2).

(1) A compound represented by the general formula (II) is reacted with monochloroacetyl or monobromoacetyl chloride or bromide, β-chloropropionyl or β-bromopropionyl chloride or bromide, acrylyl chloride or bromide, vinylsulfonyl chloride or bromide, or the like, in an inert solvent to produce a compound represented by the following formula (III) or (III')

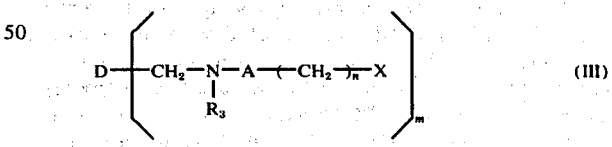

or

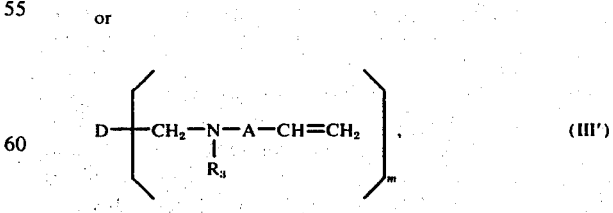

which compound (III) or (III') is then reacted with a primary or secondary amino compound to prepare an organic pigment derivative represented by the following formula (I)

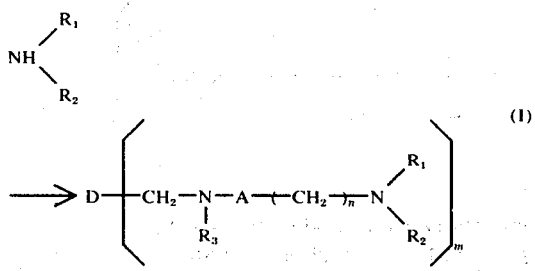

wherein D, A, $R_1$, $R_2$, $R_3$, n and m are as defined above; and X is a chlorine or bromine atom.

2. A starting organic pigment is reacted, in polyphosphoric acid or concentrated sulfuric acid, with both paraformaldehyde and any one of monochloroacetamide, monobromoacetamide, monochloroacetalkylamide, monobromoacetalkylamide, β-chloropropionamide and its alkylamides, β-bromopropionamide and its alkylamides, β-chloroethylsulfonamide, and β-bromoethylsulfonamide, to produce a compound represented by the general formula (III), which compound is then reacted with a primary or secondary amino compound to obtain an organic pigment derivative represented by the formula (I).

The base organic pigments and the starting organic pigments the residue of which is represented by the symbol "D" in the formula (I) include phthalocyanine, quinacridone, thioindigo, dioxazine, isoindolinon, quinophthalone, azo, imidazole, anthraquinone and perylene type pigments.

The primary and secondary amines used herein include methylamine, ethylamine, propylamine, isopropylamine, n-butylamine, isobutylamine, n-amylamine, isoamylamine, n-hexylamine, octylamine, 2-ethylhexylamine, decylamine, dodecylamine, stearylamine, dimethylamine, diethylamine, di-n-butylamine, diamylamine, diethanolamine, 2-ethylaminoethanol, 2-dodecylaminoethanol, cyclopentylamine, cyclohexylamine, aniline, o-, m- and p-toluidines, o-, m- and p-methoxyanilines, benzylamine, α-naphthylamine, piperidine, pipecoline, pyrrolidine, morpholine, 2-diethylaminoethylamine, 3-diethylaminopropylamine, α-piperidinoethylamine, N-methylaniline, N-ethylaniline, N-ethyl-m-toluidine, 2,4-dimethylaniline, 2,5-dimethylaniline and α-anilinoethylamine.

The compounds represented by the aforesaid general formulae (III) and (III') are reacted with the above-mentioned amino compounds in excessive amounts with respect to those of the former used, at temperatures of from 60 to 150°C in water or an inert solvent.

The mixing ratio by weight of the base organic pigment to the organic pigment derivative represented by the formula (I) is preferably in the range of approximately 100 : 0.5 – 30.

The use of the derivative of the formula (I) in less amounts in the base organic pigment will be less effective in improving the resulting pigment composition in the various properties as mentioned above, while a comparative pigment composition containing the derivative in greater amounts than said range according to this invention will tend to deteriorate the solvent resistance of colored products (such as colored paints and inks) if these products contain said comparative pigment composition for their coloration. The most preferable mixing ratios are in the range of 100 : 3 – 15.

The mixing may be effected in any suitable manner and, for example, it is effected by simply mixing the base pigment with the starting pigment derivative each in the form of dried powder, press cake or the like, by dissolving the two materials in concentrated sulfuric acid and then subjecting the whole to acid pasting or by ball milling or kneading said two materials while mixing them together.

In general, paints or printing inks may comprise as the vehicle or main film-forming ingredient linseed oil, rosin, shellac, phenolic resins, melamine resins, nitrocellulose, cyclized rubber, polyvinyl alcohol or the like; as the solvent or adjuvant film-forming ingredient ethyl alcohol, xylene, ethyl acetate, Cellosolve, trichloroethylene, water or the like; and as the pigment phthalocyanine, quinacridone, thioindigo or similar type pigment. The paints usually comprise such vechicle, solvent and pigment in the ratios by weight of 100 : 400 or less : 60 or less, and the printing inks usually comprise such vehicle, solvent and pigment in the ratios by weight of 100 : 400 or less : 60 or less.

The pigment compositions of this invention will not exhibit the transition of crystallization and the growth of crystals as well as changes in color and tinting strength, in an aromatic solvent not only at room temperatures but even at an elevated temperature of as high as 160°C.

These novel pigment compositions will exhibit their satisfactory dispersibility without causing flocculation in non-aqueous vehicles for paints, gravure inks or the like. They also exhibit a satisfactory flow property because of their inhibited tendency to flocculation, and they will not cause flooding and precipitation of the pigments even when used together with pigments of other kinds.

The novel compositions further exhibit their satisfactory dispersibility without causing flocculation in aqueous vehicles for paints and gravure inks, and they may successfully be used in the preparation of electrophoretic paint compositions.

This invention will be better understood by reference to the following examples in which all parts are by weight unless otherwise specified.

Example 1 (Preparation of the organic pigment derivatives) Preparation (1)

Ten parts of copper phthalocyanine were added to 150 parts of polyphosphoric acid heated to 80°C and the resulting mixture was agitated to form a solution thereof. The solution so formed was incorporated with 4 parts of paraformaldehyde and 8 parts of monochloroacetamide, and the whole was stirred at 120°C for 4 hours, cooled to 100°C, introduced into warm water, filtered, and then washed with water thereby to obtain a copper phthalocyanine derivative in pasty form having the following chemical structure (IV)

$$CuPc\{CH_2HN - COCH_2Cl\}_{1-2} \qquad (IV)$$

wherein CuPc stands for copper phthalocyanine. A part of the derivative so obtained was dried and weighed for analysis and it was found to be a mixture of mono- and di-substituted copper phthalocyanines.

Five parts on a dry basis of the compound of the formula (IV) and 3 parts of diethylamine were added to 100 parts of water to form a mixture which was then stirred under reflux for 6 hours, after which the resulting reaction mixture was filtered, washed with water and dried to obtain a derivative of copper phthalocyanine, which derivative is in the form of blue-colored powder, easily soluble in acetic acid and assuming a deep-blue color, and represented by the following formula (V)

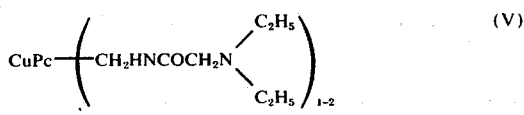

Following the procedure of Preparation (1) except that the diethylamine was substituted by each of primary and secondary amines such as di-n-butylamine, n-hexylamine, cyclohexylamine, piperidine, and 2-diethylaminoethylamine, there were obtained the corresponding copper phthalocyanine derivatives which were each dissolved in a diluted acetic acid assuming a deep-blue color.

Preparation (2)

One hundred parts of o-dichlorobenzene were incorporated with 10 parts of aminomethyl copper phthalocyanine and 5 parts of vinylsulfonyl chloride to form a mixture which was agitated at 100° – 130°C for 5 hours. The reaction mixture so produced was further incorporated with 10 parts of aniline and heated to the same temperature as above under agitation for 3 hours, after which the whole so heated was filtered, washed with methanol and then dried thereby obtaining a blue powder of copper phthalocyanine derivative having the following chemical formula (VI)

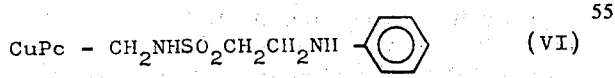

In addition, the procedure of Preparation (2) was followed except that the vinylsulfonyl chloride was substituted by each of acetyl chloride and acrylyl chloride, thereby to obtain a copper phthalocyanine derivative which was suitable for use in the preparation of the pigment composition of this invention.

Preparation (3)

Ten parts of quinacridone were added to 150 parts of polyphosphoric acid at 80°C and agitated to form a solution which was then incorporated with 3 parts of paraformaldehyde and 7 parts of monochloroacetamide to form a mixture. The mixture so formed was agitated at 80°C for 2 hours and then at 100°C for another 2 hours. The whole so agitated was introduced into warm water, filtered and washed with water to produce a pasty material which was introduced into 200 parts of water, incorporated with 7 parts of piperidine and then stirred under reflux by heating for 5 hours. The resulting reaction mixture was cooled, filtered, washed with water and dried thereby to obtain a reddish-violet powder of quinacridone derivative which was soluble in a diluted acetic acid and expressed by the following formula (VII)

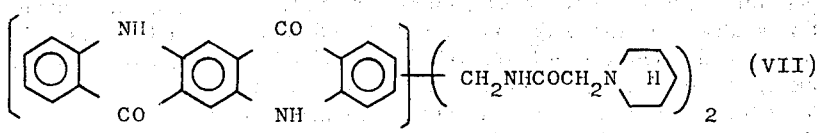

Preparation (4)

The procedure of Preparation (3) was followed except that the quinacridone was substituted by an azo pigment represented by the following chemical formula (VIII)

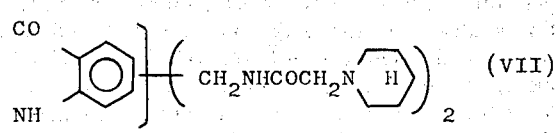

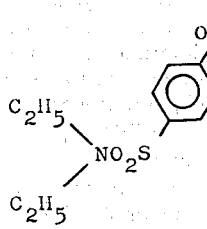

thereby to obtain a bluish-red powder of methylated piperidinoacetamidomethyl derivative of said azo compound.

Preparation (5)

Nine parts of an imidazole pigment represented by the following formula (IX)

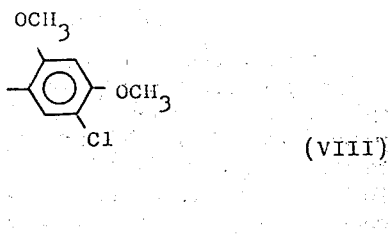

were added to 120 parts of polyphosphoric acid at 80°C to dissolve the former in the latter. The resulting solution was incorporated with 2.5 parts of paraformaldehyde and 6 parts of monochloroacetamide and the resulting mixture was agitated at 100 – 120°C for 5 hours. The reaction mixture so agitated was introduced into warm water, filtered, washed with water, introduced into 200 parts of water, incorporated with 7 parts of N-ethyl-m-toluidine and then stirred under reflux for 5 hours. The mixture so treated was cooled, filtered, washed with water and then dried thereby to obtain a brown-colored powdery compound having the following chemical structure (X)

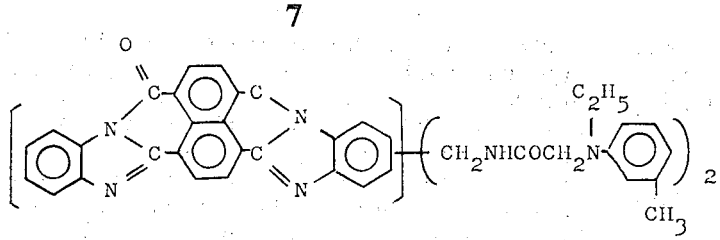

Preparation (6)

Ten parts of copper phthalocyanine were added to 100 parts of concentrated sulphuric acid and agitated to form a solution which was incorporated, at 100°C, with 4 parts of paraformaldehyde and 8 parts of monobromoacetomethylamide and agitated at the same temperature as above for three hours, after which the reaction mixture was introduced into iced water, filtered, washed with water, transferred into 200 parts of water, incorporated with 7 parts of morpholine and stirred under reflux for 6 hours. The material so treated was filtered and then dried thereby to obtain a copper phthalocyanine derivative in blue powder form having the following chemical structure (XI)

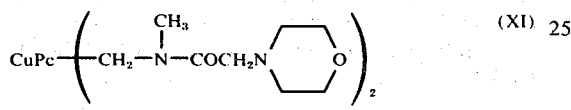

Preparation (7)

Ten parts of quinacridone were added to 150 parts of polyphosphoric acid at 80°C. The resulting mixture was agitated to form a solution, incorporated with 3 parts of paraformaldehyde and 8.5 parts of $\beta$-chloropropionyl chloride and agitated at 80°C for two hours and then at 100°C for additional 4 hours, after which the reaction mixture was introduced into warm water, filtered, washed with water, introduced into 200 parts of water, incorporated with 7 parts of piperidine and then stirred under reflux for 5 hours. The reaction mixture so treated was cooled, filtered, washed with water and dried thereby obtaining a quinacridone derivative which is soluble in a diluted acetic acid, assuming a red-violet color, and is represented by the following chemical structure (XII)

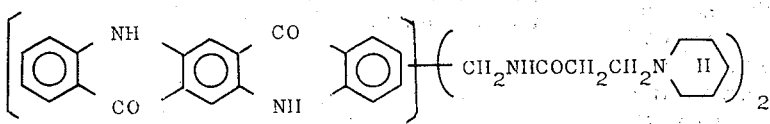

EXAMPLE 2

Both six parts of methylated diethylaminoacetamidemethyl copper phthalocyanine (V) obtained from Preparation (1), and 100 parts of a crude, copper phthalocyanine were dissolved in conc. sulfuric acid to form a solution which was introduced into water and filtered to recover the material reprecipitated. The material so recovered was washed with water and dried thereby to obtain a pigment composition in which the two copper phthalocyanines were together mixed. The thus obtained pigment composition (16.5 parts) and 283.5 parts of an alkyd melamine type resin varnish were milled together with 2000 parts of stainless steel balls in a 1-liter ball mill thereby to obtain a paint. The paint just after completion of the milling was measured for its viscosity at 25°C by the use of a BM type rotational viscometer, and the results are shown in Table 1 from which it is found that the paint does not exhibit structural viscosity.

Table 1

| Rotational frequency (rpm) | 6 | 12 | 30 | 60 |
|---|---|---|---|---|
| Viscosity (cps) | 300 | 285 | 280 | 270 |

The same paint was allowed to stand for one week since its preparation and then measured for its viscosity in the same manner as above. The results are shown in Table 2 from which it is seen that this paint does not increase in viscosity during the storage thereof.

Table 2

| Rotational frequency (rpm) | 6 | 12 | 30 | 60 |
|---|---|---|---|---|
| Viscosity (cps) | 310 | 290 | 280 | 280 |

In addition, the paint obtained by the aforesaid ball milling was mixed with a white paint containing titanium dioxide as the pigment in a ratio of the former to the latter of 1:10 to prepare a light-colored paint. The paint so prepared was adjusted in viscosity by using therein a xylene-ethyl acetate mixed solvent so that the resulting viscosity reaches a value of 20 – 22 seconds as determined with Ford Cup No. 4, and the paint so treated was allowed to stand in a test tube with the result that it did not exhibit flocculation and precipitation of the pigment even after the lapse of time of one month.

For comparison, a paint was prepared in the same manner as above except that there was used as the pigment $\alpha$-type copper phthalocyanine pigment prepared by adjusting a crude copper phthalocyanine alone as indicated above. The paint so prepared caused the transition of crystallization and very remarkable flocculation, thereby making it impossible to use the paint as such.

EXAMPLE 3

Ten parts of copper phthalocyanine derivative (VI) obtained in Preparation (2) and 100 parts of a crude copper phthalocyanine, together with 770 parts of sodium sulfate, were charged into a 2-gallon kneader to form a mixture which was kneaded for 5 hours. The mixture so kneaded was thereafter washed with water and dried thereby obtaining a copper phthalocyanine pigment composition. This composition was treated in the same manner as in Example 2 to prepare an alkyd-melamine baking paint (hereinafter being referred to as "Paint A").

For comparison, the aforesaid procedure was followed except that said crude phthalocyanine and derivative (VI) were substituted by $\beta$-type copper phthalocyanine only (without the use of a pigment derivative according to this invention), thereby to obtain a conventional paint (hereinafter being referred to as "Paint A'"). These Paints A and A' were measured for viscosity in the same manner as in Example 2. The results are shown in Table 3 from which it is clear that Paint A according to this invention has a very low viscosity and exhibits no structural viscosity in comparison with Paint A'.

Table 3

| Rotational frequency (rpm) | 6 | 12 | 30 | 60 |
|---|---|---|---|---|
| Viscosity of Paint A (cps) | 320 | 310 | 310 | 310 |
| Viscosity of Paint A' (cps) | 3,400 | 2,300 | 2,100 | 1,800 |

In addition, these Paints A and A' were treated in the same manner as in Example 2 to make light-colored paints which were adjusted in viscosity and allowed to stand in test tubes, respectively. The results were that the light-colored paint prepared from Paint A did not exhibit precipitation and flocculation of the pigments while that prepared from Paint A' clearly exhibited flocculation of the pigment.

EXAMPLE 4

Piperidinoacetamidomethyl copper phthalocyanine (1.2 parts) was dissolved in a 2% aqueous solution of acetic acid. Separately, 10 parts of a crude copper phthalocyanine were dissolved in 100 parts of a conc. sulfuric acid to form a solution which was introduced into iced water, filtered, washed with water and again dispersed in water. The dispersion so obtained was incorporated with a properly prepared aqueous solution of acetic acid, thoroughly stirred and incorporated with ammonia water to be made alkaline, after which the alkalified dispersion was filtered, washed with water and then dried thereby to obtain a copper phthalocyanine pigment composition. A paint is prepared using this pigment composition as such in the same manner as in Example 2, and the paint so prepared was tested for its properties with the result that it had very excellent properties as the previously-mentioned ones according to this invention.

EXAMPLE 5

A laboratory-type ball mill containing 4000 parts of ceramic balls was charged with 2 parts of the quinacridone derivative (VII) obtained in Preparation (3), 30 parts of linear quinacridone and 400 parts of table salt, and the ball mill so charged was rotated at 50 r.p.m. for 48 hours, after which the table salt was removed by dissolving in water, thus obtaining a pigment composition. The pigment composition so obtained was treated in the same manner as in Example 2, thereby obtaining an alkyd-melamine resin paint which was excellent in dispersibility and non-flocculating property of the pigment and did not cause migration thereof.

On the other hand, the same paint prepared as indicated above except that linear quinacridone alone was subjected to the same treatment and used in said paint as the pigment, was inferior in flow property and found to cause flocculation of the pigment.

EXAMPLE 6

The azo pigment derivative obtained in Preparation (4) was mixed with azo pigment (VIII) in the mixing ratio by weight of 5 : 95 to produce a pigment composition. The pigment composition so produced was then compounded with a vinyl chloride varnish for gravure printing inks to the extent that the pigment in the pigment composition amounted to 10% by weight of the resulting gravure printing ink. The ink so obtained was measured for its viscosity with the result being shown in the following Table 4.

Table 4

| Rotational frequency (rpm) | 6 | 12 | 30 | 50 |
|---|---|---|---|---|
| Azo pigment (X) alone | 2,700 | 1,500 | 940 | 610 |
| Pigment composition (95:5) | 1,300 | 1,040 | 790 | 550 |

The pigment contained in the pigment composition of this invention is excellent in flow property and enables prints obtained with an ink containing said pigment composition to be excellent in color and gloss.

EXAMPLE 7

The imidazole pigment derivative (X) obtained in Preparation (5) was mixed with the imidazole pigment (IX) in the ratio by parts of 1 : 9 to prepare an imidazole pigment composition. An air-drying type alkyd resin paint prepared using this pigment composition by the use of the usual method, is satisfactory in flow property and is not found to cause the flocculation and crystal growth of the pigment. On the other hand, if the imidazole pigment (IX) alone is used as the pigment in the preparation of such a resin paint, the paint so prepared will cause the crystal growth of the pigment and allow gel formation to proceed thereby making impossible the use of the paint as such.

EXAMPLE 8

One part of the quinacridone derivative obtained in Preparation (7) and 6 parts of a crude quinacridone pigment were dissolved in a concentrated sulfuric acid and introduced into water to form a re-precipitate which was filtered off, washed with water and dried to obtain a quinacridone pigment composition. The pigment composition so obtained may be used in the same manner as in Example 2 in the preparation of an alkyd-melamine resin paint which is superior in dispersibility and non-flocculating property of the pigment. In contrast, an alkyd-melamine resin in which a pigment prepared by acid-pasting a crude quinacridone pigment alone is used as the pigment, is inferior in flow property and found to cause the flocculation of the pigment.

EXAMPLE 9

Seven parts of the copper phthalocyanine derivative (XI) obtained in Preparation (6) were mixed with 93 parts of copper phthalocyanine pigment to produce a pigment composition which was then added to a styrene-maleic acid type aqueous gravure printing ink base to the extent that the pigment amounted to 15% by weight of the resulting aqueous gravure printing ink. The resulting aqueous ink was successfully used in gravure printing and indicated the excellency of the pigment in dispersibility and flow property with the result that prints having satisfactory color and gloss were obtained.

What is claimed is:

1. A pigment composition consisting essentially of as the base material a base organic pigment and as the additive the derivative of a starting organic pigment in the ratios by weight of 100 : 0.5–30, the base and starting organic pigments being different from, or identical with, each other and the derivative being represented by the following general formula

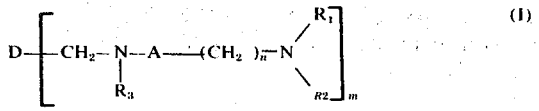

wherein D is the residue of the starting organic pigment, A is a carbonyl or sulfonyl group, $R_1$ and $R_2$ are each a hydrogen atom, non-substituted or substituted alkyl group containing 1–18 carbon atoms, cycloalkyl group, aryl group or heterocyclic residue, or they may form a ring, $R_3$ is a hydrogen atom or lower alkyl group, n is an integer of from 1 to 2 and m is an integer of from 1 to 4.

2. A pigment composition as claimed in claim 1, wherein the organic pigment derivative (I) is prepared by reacting, in an inert solvent, a compound represented by the following general formula (II)

wherein D is the residue of an organic pigment, $R_3$ is a hydrogen atom or lower alkyl group and m is an integer of from 1 to 4, with a member selected from the group consisting of monochloroacetyl and monobromoacetyl chloride and bromide, β-chloroproplonyl and β-bromopropionyl chloride and bromide, acrylyl chloride and bromide, and vinylsulfonyl chloride and bromide to produce a compound having the general formula (III) or (III')

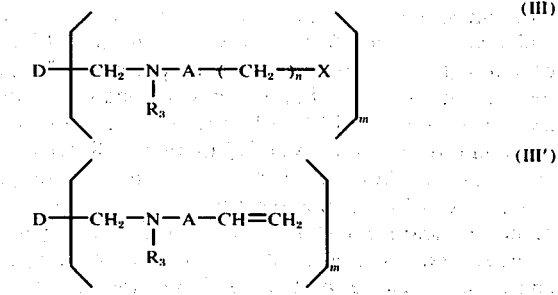

wherein D, A, $R_3$ and M are as defined above and X is a chlorine or bromine atom, and further reacting the thus-produced compound (III) or (III'') with a member selected from the group consisting of primary and secondary amino compounds respectively represented by the following formulae

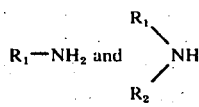

wherein $R_1$ and $R_2$ are each a hydrogen atom, non-substituted or substituted alkyl group containing 1–18 carbon atoms, cycloalkyl group, aryl group or heterocyclic residue, thereby to obtain the pigment derivative (I).

3. A pigment composition as claimed in claim 1, wherein the organic pigment derivative (I) is prepared by reacting, in polyphosphoric acid or a concentrated sulfuric acid, an organic pigment with paraformaldehyde and a member selected from the group consisting of monochloroacetamide, monobromoacetamide, monochloroacetalkylamide, monobromoacetalkylamide, β-chloropropionamide and its alkylamides, β-bromopropionamide and its alkylamides, β-chloroethylsulfonamide and β-bromoethylsulfonamide, to produce a compound having the general formula (III) and then reacting the thus-produced compound (III) with a member selected from the group consisting of primary and a secondary amino compounds respectively represented by the following formulae

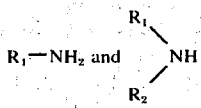

wherein $R_1$ and $R_2$ are each a hydrogen atom, nonsubstituted or substituted alkyl group containing 1–18 carbon atoms, cycloalkyl group, aryl group or heterocyclic residue to obtain the pigment derivative (I).

4. A pigment composition as claimed in claim 1, wherein the base organic pigment and the starting organic pigment include phthalocyanine, quinacridone, thioindigo, dioxazine, isoindolinone, quinophthalone, azo, imidazole, anthraquinone and perylene type pigments.

5. A pigment composition as claimed in claim 2, wherein the primary and secondary amino compounds include methylamine, ethylamine, propylamine, isopropylamine, n-butylamine, isobutylamine, n-amylamine, isoamylamine, n-hexylamine, ocytlamine, 2-ethylhexylamine, decylamine, dodecylamine, stearylamine, dimethylamine, diethylamine, di-n-butylamine, diamylamine, diethanolamine, 2-ethylaminoethanol, 2-dodecylaminoethanol, cyclopentylamine, cyclohexylamine, aniline, o-, m- and p-toluidines, o-, m- and p-methoxyanilines, benzylamine, α-naphtylamine, piperidine, pipecoline, pyrrolidine, morpholine, 2-diethylaminoethylamine, 3-diethylaminopropylamine, α-piperidinoethylamine, N-methylaniline, N-ethylaniline, N-ethyl-m-toluidine, 2,4-dimethylaniline, 2,5-dimethylaniline and α-anilinoethylamine.

6. A pigment composition as claimed in claim 1, wherein the base organic pigment is a phthalocyanine type pigment.

7. A pigment composition as claimed in claim 6, wherein the starting organic pigment is a phthalocyanine type pigment.

8. A pigment composition as claimed in claim 2, wherein the reaction between the compound (III) or (III') and the primary or secondary amino compound is carried out at 60°–150°C using the amino compound in excessive amounts in water or an inert solvent.

9. A pigment composition as claimed in claim 3, wherein the reaction between the compound (III) or (III') and the primary or secondary amino compound is carried out at 60°–150°C using the amino compound in excessive amounts in water or an inert solvent.

10. A paint consisting essentially of a film-forming ingredient, a solvent therefor and the pigment composition of claim 1 in the ratios by weight of 100 : 400 or less : 60 or less.

11. A printing ink consisting essentially of a film-forming ingredient, a solvent therefor and the pigment composition of claim 1 in the ratios by weight of 100 : 400 or less : 60 or less.

* * * * *